United States Patent [19]

Niwano et al.

[11] Patent Number: 5,591,471
[45] Date of Patent: Jan. 7, 1997

[54] PRODUCTION METHOD OF PUFFED FOOD AND PUFFED FOOD DOUGH

[75] Inventors: Shichiro Niwano, 6-10, Harukaze-cho, Koshien, Nishinomiya, Hyogo, 663 JPX; Norihumi Idomoto, Nabari, Japan

[73] Assignee: Shichiro Niwano, Hyogo, Japan

[21] Appl. No.: 397,162

[22] PCT Filed: Jul. 6, 1994

[86] PCT No.: PCT/JP94/01100

§ 371 Date: Mar. 6, 1995

§ 102(e) Date: Mar. 6, 1995

[87] PCT Pub. No.: WO95/01731

PCT Pub. Date: Jan. 19, 1995

[30]   Foreign Application Priority Data

Jul. 7, 1993  [JP]  Japan ..................................... 5-193061

[51] Int. Cl.$^6$ ............................ A21D 2/36; A23L 1/0522
[52] U.S. Cl. ............................ 426/440; 426/46; 426/445; 426/460; 426/465; 426/466; 426/470; 426/549; 426/625; 426/634
[58] Field of Search ................................ 426/46, 440, 549, 426/625, 634, 445, 460, 465, 466, 470

[56]   References Cited

U.S. PATENT DOCUMENTS

| | | | |
|---|---|---|---|
| 3,615,658 | 10/1971 | Glabe | 426/634 |
| 3,978,244 | 8/1976 | Sair | 426/445 |
| 4,757,007 | 7/1988 | Satoh et al. | 426/46 |
| 5,009,916 | 4/1991 | Colliopoulos | 426/445 |
| 5,026,568 | 6/1991 | Takemori et al. | 426/634 |

*Primary Examiner*—Helen Pratt
*Attorney, Agent, or Firm*—Finnegan, Henderson, Farabow, Garrett & Dunner

[57]   ABSTRACT

A puffed food dough and method for producing a puffed food product from the dough. The dough contains soybean protein, starch and dietary fiber in a ratio by weight of from 1:0.2 to 0.8:0.01 to 0.4, respectively, and from 0.5 to 5 parts by weight of a vegetable foaming agent and from 150 to 300 parts by weight of water per 100 parts by weight in total of the soybean protein, starch, and dietary fiber. The dough does not contain a chemical leavening agent or yeast.

10 Claims, No Drawings

PRODUCTION METHOD OF PUFFED FOOD AND PUFFED FOOD DOUGH

TECHNICAL FIELD

The present invention relates to a method for producing puffed food and a puffed food dough. More particularly, the invention relates to a method for producing puffed food characterized by a higher content of soybean protein and dietary fiber and a lower content of cholesterol and a dough used for such food.

BACKGROUND ART

Recently, to avoid various problems caused by eating too much animal food, low-calorie foodstuffs have been drawing public attention as healthy food. In addition, the relation between food and prevention of diseases has been clarified, and it is known, for example, that those containing fibers and less fat help to reduce risks of cancer, and those containing fibers and less cholesterol reduce risks of coronary heart diseases. Thus, healthy food that helps to maintain and promote human health attracts public attention, and such food that is rich in protein and low in calories and contains dietary fibers and the like is studied, and sold in the market.

Although various healthy foods have been studied and commercialized as described above, because the term, "healthy food", has not been clearly defined, and has for different meanings, it has caused a problem that misunderstanding or confusion on the part of consumers In order to solve the problem, the U.S. Food and Drug Administration (FDA) has established a guideline stating, if total fat, saturated fat, cholesterol and sodium contained in a serving size of a particular foodstuff are higher than specified levels, the foodstuff cannot be claimed as being a healthy food. More specifically, a foodstuff of a meal type, for example, cannot be claimed as being healthy food, if total fat of 26.0 g or more, saturated fat of 8.0 g or more, cholesterol of 120 mg or more and sodium of 960 mg or more are contained in a serving size of the particular foodstuff. In the case of packaged foodstuffs, a nutritional specification showing contents of ingredients must be provided as well.

Of the above-mentioned healthy foods, those using a soybean protein instead of animal meat protein are very important to prevent intake of excessive fat and calories. Since a soybean protein is particularly excellent in the balance of essential amino acids, and very nutritious, a variety of foodstuffs rich in protein and low in calories with a soybean protein contained as a protein source are studied. As a part of such study, addition of a soybean protein to such puffed food as bread has been also studied. In a puffed food like bread which is made from such milled grains as wheat flour, starches and such expanding agent as yeast and baking powder, if a soybean protein is used entirely or partly in place of such material as wheat flour, the puffed food obtained is low in loaf capacity and gives a tough touch, when it is eaten, so a foodstuff that sufficiently satisfies the human taste has never been obtained. In order to solve the problem, the inventors proposed a method of obtaining a bread-like puffed food that comprises a soybean protein, wheat flour and eggs, and that has a high content of soybean protein by puffing a dough using an expanding agent (see Japan Laid-open Pat. No. 144936/1989).

The puffed food produced by such method as disclosed in the laid-open patent is high in loaf capacity, excellent in touch, flavor and nutritional balance, and is favorably accepted in Japan, United States and many other countries. However, has the problem that the puffed food obtained in such manner contains much cholesterol, and fails to meet the above-mentioned FDA specification, because eggs that are high in cholesterol content are used as a foaming agent for improving the touch and the puffing effect. It is another problem that the food cannot be served to those who are religiously prohibited from eating eggs. Additionally, use of chemical expanding agents has been a problem as well.

In the light of such problems, it is an object of the invention to provide a method for producing a food superior in flavor, touch and nutritional balance, low in cholesterol content, and containing a soybean protein and dietary fibers and a dough for such puffed food.

SUMMARY OF THE INVENTION

The method of producing puffed food according to the invention comprises the step of heating a dough containing a soybean protein, starch and dietary fiber at the ratio of 1:0.2 to 0.8:0.01 to 0.4 (by weight) with a vegetable foaming agent of 0.5 to 5 parts by weight and water of 150 to 300 parts by weight added to a total of 100 parts by weight of the soybean protein, starch and dietary fiber. According to the method, the puffed food obtained containing a soybean protein is dietary fiber and lower in cholesterol content.

In addition, the invention provides a puffed food dough used for producing the puffed food. The dough is a foamed material containing a number of fine foams formed therein, and puffed food similar to bread and cookies can be produced by heating the dough so that the dough is puffed by evaporation of water content, and the soybean protein is gelled.

DETAILED DESCRIPTION OF THE INVENTION

The invention is constituted as described above, and a separated soybean protein that has high protein content (generally 85 to 90% in protein content), and is superior in gelling property, whiteness, odorlessness and other properties is the most preferable, although any soybean protein that is gelled by adding water and heating can be used. As a grain size of the separated soybean protein is unspecified, separated soybean proteins commercially available, for example, Fuji Pro R, K and V [tradenames, all manufactured by Fuji Oil Co., Ltd., Japan ] can be employed.

As for starch, those containing starch as a main ingredient, for example, corn starch, potato starch, sweet potato starch, wheat starch and modified starch can be used.

For dietary fiber, any eatable dietary fiber source, either soluble or insoluble, may be employed, such as polydextrose (90% or more in content of dietary fiber) and corn fiber [ex., Nisshoku Celfer (tradename) at 85% in content of dietary fiber] that mainly consist of dietary fibers as well as such food materials containing dietary fibers as bran (approximately 10% in content of dietary fibers), raw bean-curd refuse (approximately 4% in content of dietary fibers) and powdered bean-curd refuse (approximately 40% in content of dietary fibers). Usage of such dietary fiber sources should be adjusted by calculating the content of dietary fibers, so that the above-mentioned ratio is realized.

According to the invention, contents of the soybean protein, starch and dietary fiber are adjusted to generally provide the ratio of 1:0.2 to 0.8:0.01 to 0.4 (ratio by weight, also applicable hereinafter unless it is differently specified), preferably 1:0.33 to 0.7 0.05 to 0.3. If the content of starch is higher than 0.8 in relation to 1 part of soybean protein, the puffing property is inferior, and it is difficult to obtain a puffed product having a high loaf capacity, while a nutrition balance is poor, if the content is lower than 0.2. Similarly, if the content of dietary fiber in relation to 1 part of the soybean protein exceeds 0.4, the puffing property is insufficient, the puffed food is rough to the tongue and difficult to swallow, while addition of dietary fibers is meaningless, if the content is lower than 0.01.

According to the invention, a vegetable foaming agent is used instead of egg-originated foaming agents. Thus, a puffed food containing less cholesterol is obtained. Various foaming agents may be used as long as they are vegetable, including such soybean protein foaming agent as enzyme-decomposed soybean proteins, cellulose foaming agents of fine powders [ex., Celcream [tradename], a creamy product containing 12.5% of solid ingredients (97.6% in content of cellulose in the solid ingredients)] and freeze-dried yam powders. Specifically, soybean protein foaming agents are preferable because of their superior foaming property and high foam stability and thermal stability, and because they of the invention meet the object of providing a high content of soybean protein. Such soybean protein foaming agents are available as Versa Whip K, Mirafoam K [tradenames, both of them manufactured by Stery, U.S.A.] and Fuji Soft [tradename, manufactured by Fuji Oil Co., Ltd., Japan]. In the case of using bean-curd refuse as a dietary fiber source, as the foaming agent, it is preferable to use a cellulose foaming agent of fine powders only or together with other foaming agents, because it is effective for giving a soft touch to the food, and reducing a touch characteristic of the bean-curd refuse.

The foaming agent is used at content of 0.5 to 5, preferably about 1 to 2 parts by weight in relation to 100 parts by weight in total of the soybean protein, starches and dietary fibers. If the content of foaming agent is lower than 0.5 parts by weight in relation to 100 parts by weight of a mixture of the above ingredients, it provides an insufficient foaming performance, and puffing is insufficient, resulting in a food of low loaf capacity, while a content higher than 5 parts by weight is relatively unpreferable, because the food is puffed too much, and an excessive void parts are formed.

Incidentally, a foam stabilizing agent such as agar, vegetable gums (guar gum, psyllium seed gum, locust bean gum, etc.), water-soluble starches, water-soluble soybean protein, glucomannans, carboxymethyl cellulose and chitosan can be also used in combination with the above-mentioned foaming agents. Out of them, such viscous materials as vegetable gums and glucomannans effect the dietary fibers so that they are softer in touch to the tongue. Although the amount of stabilizing agent used depends on the stabilizing property of a particular agent, it should be at a ratio by weight of approximately 0.5 to 15, preferably, 0.75 to 10 parts to 1 part of the foaming agent.

Usage of water should be 150 to 300, preferably about 180 to 250 parts by weight to 100 parts by weight in total of the soybean protein, starch and dietary fiber. If the water content is lower than 150 parts by weight, the dough is hard and insufficient in expandability, while the water content of more than 300 parts by weight is unpreferable, because the dough comes to be sticky and poor in processability, and excessive puffing may be caused, when it is processed by heat.

By mixing and kneading the raw materials, the puffed food dough according to the invention is obtained. Various additives conventionally used in the food industry may be added to the dough according to a desired nutritional balance, form of food and the like. Such additives may be seeds, nuts, seaweed, leaves and the like. As seeds and nuts, for example, sesame, macadamia nut, almond, hempseed, cashew nut, pumpkin seed, kaya seeds, gingko, chestnut, walnut, coconut, pistachio, hazelnut, pine nut, and peanut may be used. Specifically, sesame that is rich in vitamins and macadamia nut containing less cholesterol are preferably employed. The seeds and nuts should be preferably added to the dough after soaking in water and covering with soybean protein over a wet surface thereof for providing a higher adhesion to the dough, and preventing them from falling from the puffed food when it is sliced after puffing.

As seaweed, hijiki seaweed, kelp, wakame seaweed and the like may be used. Since seaweed are rich in minerals, by adding seaweed, the nutritional balance of the puffed food can be improved. In the case of using seaweed, it is preferable that raw seaweed is cut into an appropriate size, pieces subjected to a drying process at a low temperature such as freeze-drying after they have been blanched (i.e. soaked in hot water for a while), then, chipped or powdered before use. The blanching process is effective for vivifying and maintaining the color of seaweed, and reducing change in quality of the seaweed by inactivating thermally unstable enzymes in the seaweed.

For leaves, tea, carotenoid vegetables, Japanese mugwort and the like may be employed. Such leaves contain various nutriments effective for maintenance of human health such as beta-carotene, flavonoids, and superoxide dismutase, and are effective for health maintenance. Although such leaves may be added to the dough without any processing, it is preferable that they are subjected to such drying process at a low temperature as freeze-drying after blanching, and chipped or powdered similarly to the seaweed. When the leaves are added to the dough without any processing, they are preferably soaked in water, as described above, and added to the dough after they are covered with a soybean protein over the wet surface thereof.

The above-mentioned various types of additives are respectively added at the ratio of 15 parts or less, preferably, 5 to 10 parts by weight to 100 parts by weight in total of a soybean protein, starch and dietary fiber.

Furthermore, such conventional food additives used in the field may be appropriately added as seasonings as salt, sodium glutamate, sodium inosinate, sodium guaninate, sugar, sweet oligo and oligosaccharide syrup, acidifiers as citric acid and malic acid, thickening agent as sodium alginate, vitamins as vitamins A, B, E and K and minerals as calcium lactate, precipitated calcium carbonate, zinc gluconate, zinc sulfate, copper gluconate and copper sulfate.

Although the dough may be prepared in various ways by appropriately changing the mixing sequence of the raw materials listed above, a preferred example of a preparation method is one where specified amounts of water and foaming agent are firstly placed in a mixer, a stabilizing agent is added thereto when it is required, then, the foaming and stabilizing agents are solved by agitation at a low speed using a hopper, and the mixture is sufficiently foamed by agitation at a high speed (preferably, foamed approximately 8 to 10 times of water initially applied). A specified amount of soybean protein, starch and dietary fiber are added gradually to the foamed liquid, the additives and seasonings are applied, if desired, and the entirety is sufficiently agitated. Then, by replacing the hopper with a hook, agitating the mixture sufficiently, and forming it into a desired shape, the dough is obtained.

According to the method, the foaming performance of foaming agent is maintained, and the dough with the materials mixed evenly can be obtained. It is preferable that solid materials contained in the dough should be adjusted to approximately 25 to 50% by weight, if the content of solid materials is less than 25%, the content of water in the dough is excessive, and the shape of dough cannot be maintained, while the puffing is insufficient, if the content exceeds 50% by weight.

The dough obtained in such manner may be immediately processed by heat to make the puffed food, or frozen for storing it for a long time in a stable condition. Such freezing and storing possibility is a main characteristic of puffed food dough according to the invention. In other words, as consumers become quality-oriented, and enjoy different styles of meals, and a cold chain is developed, open fresh bakeries and bake-off shops are coming to be popular, where breads freshly baked from frozen dough there are sold. Although it is essential for such service that dough can be frozen and stored in a stable condition for a long time, because conventional dough comprising wheat flour and yeast has such problems that 1. the dough comes to be bitter, because the yeast produces an alcohol when it is frozen, and; 2. such freezing problem as insufficient puffing is caused, because the yeast itself is destroyed, and aglutathione in the cell comes out, which breaks the S-S bond of gluten, food products satisfactoin flavor and puffing cannot be obtained. Accordingly, a puffed food dough superior in freeze-storability is demanded, and the invention is effective for solving such problem.

Incidentally, although the dough may be formed in a desired shape using any conventional method, in the case of the dough that is frozen and stored, it is preferable to use an extruder or the like for shaping the dough under pressure. By shaping it under pressure, cracking in the dough surface can be prevented during freeze-storage. By preventing cracking of the dough, when the dough is heated, leakage of evaporated water is reduced, puffing is enhanced, and a puffed product having a superior outlook can be obtained. In addition, for freezing and storing the dough, it is preferable to quickly freeze the dough by using liquid nitrogen or the like.

The production method according to the invention comprising the step of heating the dough obtained in such manner for puffing it to produce the puffed food. In the operation, it is unnecessary to ferment the dough, and puffed food having an excellent flavor and touch can be obtained by heating either the dough immediately after it is obtained or the frozen dough after or without thawing it.

Means for heating the dough is unspecified, and such conventional heating method as heating by an oven and microwave irradiation may be employed. Microwave heating is preferable. With microwave, heating, the dough is heated from the inside, resulting in a food higher in loaf capacity and evenly puffed. Moreover, when heating the dough by means of, it is more preferable that the microwave heating be effected under a flow of air (preferably, at an air temperature of 70° to 110° C.) to prevent dewdrops being formed on a wall of the microwave irradiation chamber, and efficiently evaporating Water contained in the dough. In addition, by time-course change of microwave output to the dough, puffing can be controlled, and excessive heating and burning of the dough can be prevented.

The microwave heating is performed by irradiating microwaves to the dough, and microwaves with a frequency range of 13 MHz to 18,000 MHz are generally used, although it is not particularly specified. The energy of the microwaves used is also appropriately selected according to the water content of the dough, irradiation time and the like. In microwave, heating it is preferred to provide air, i.e. under air flow, in order to prevent dewdrops from forming on a wall of the irradiation chamber by evaporated water, and assure efficient evaporation of the water. A flow rate of air should be appropriately selected according to the size of dough being prepared, and an air temperature range of 70° to 110° C. is generally preferred in terms of efficiency, although it is not particularly specified.

Microwave heating may be effected either by a batch or continuous system, or using a rotary-table system with a blower. It is also preferred that the dough be placed on a mesh or meshed belt comprising material that allows easy penetration of microwaves such as Teflon-coated glass fibers, reinforced plastics and the like, and the microwaves are irradiated to the dough from both upper and lower sides.

Preferably, the microwave heating is conducted such that the microwave output to the dough is sequentially changed for puffing the dough, and the microwave radiation apparatus comprises plural chambers continuously disposed. Further that the microwave output is sequentially reduced from a high output in an initial irradiation chamber (first chamber) so that a large quantity of water is evaporated initially by feeding the dough continuously through the first chamber, and the output of microwaves is adjusted thereafter according to the puffing condition of the dough.

In more detail, in the case of a microwave radiation apparatus comprising four chambers disposed continuously, it is preferable that the output of microwaves in the first and second chambers be changed in multiple steps, such as 2.6 kW or 5.2 kW, and that in third and fourth chambers finely adjusted, for example, within a range of 0 to 5 kW, so that the puffed food will be prevented from being burnt due to excessive irradiation of microwaves. Thus puffed food products having different puffing degrees are easily produced, and forms of puffed food can be also controlled by using such microwave radiation apparatus, and adjusting the outputs of the chambers.

In the case of producing the puffed food using an oven, the dough according to the invention can be heated by an oven in a conventional manner (at a temperature of 100° C. or higher, generally about 120° to 250° C., preferably about 150° to 200° C. for 3 to 10 min, generally 5 to 6 min) to produce the puffed food.

The puffed food product obtained according to the invention by such heating methods as described above is similar to bread, cookie or chou of 2.5 to 5 times in puffing ratio, and can be used in such various fields as bread, buns, snack food, pastry and food material. It is specifically optimum as healthy food, because it is made of natural food materials, and is reduced in cholesterol content. Moreover, it is characterized by a good flavor that is maintained for a long time. The dough according to the invention can be also characterized in that it is frozen for storage, and readily eaten, because such puffed food as described can be obtained only by heating the frozen dough in storage.

EXAMPLE

The invention is described in detail in the following Examples, it should be understood that the invention is not limited by the Example.

Example 1

670 g of water and 4 g of Versa Whip K (tradename, a foaming agent of soybean protein) are put in a mixer, and slowly agitated dissolve the foaming agent. Then, a solution containing 4 g of agar is added, and aggressively agitated to make about 8 to 10 times in volume of that of the water by foaming the mixture. While the foamed solution is agitated, 210 g of Fuji Pro R (tradename, separated soybean protein), 120 g of corn starch and 20 g of polydextrose is gradually added, then, after adding 2 g of salt and 10 g of sugar, the mixture is sufficiently agitated. Succeedingly, after forming it by using an extruder, and cutting to about 120 g to 130 g a piece, a dough is obtained.

The dough obtained in such manner is placed on a meshed Teflon belt, and fed into a continuous microwave heating test apparatus (2450 MHz in frequency, 500W in output) so that it is subjected to microwaves from upper and lower sides thereof for 3 min in a blowing condition of 110 ° C. in temperature, and a puffed food similar to bread of about 3 times in puffing ratio was obtained. The puffed food obtained had very fine foams evenly distributed therein, and was excellent in flavor and taste.

The dough obtained in such manner was also placed in a plastic bag, deaerated, sealed, then, quickly frozen by leaving it at −80 ° C. in a contact freezer for 5 min, and stored at −18 ° C. in a refrigerator, no crack was found in a surface thereof. In addition, a puffed food was obtained from the frozen dough by microwave heating in a manner described above. The puffed food obtained was similar in puffing ratio and flavor to one that was obtained by microwave-heating the dough immediately after it was formed.

Examples 2 to 14

By using materials shown in Tables 1 and 2 below, a dough was obtained by a method similar to that of Example 1, and subjected to microwave heating to obtain a puffed food.

The dough obtained was similar to that of Example 1 in freeze-storability, and every puffed food obtained by heating process was about 2.5 to 4 times in puffing ratio, and was excellent in fineness of-foams, flavor and taste similarly to those of Example 1.

TABLE 1

| Embodiment No. | 2 | 3 | 4 | 5 | 6 | 7 | 8 |
|---|---|---|---|---|---|---|---|
| Water (ml) | 670 | 650 | 650 | 650 | 650 | 650 | 650 |
| Foaming agent (g) | Versa whip K 4 | Versa whip K 4 | Versa whip K 4 | Fuji Soft 4 | Fuji Soft 4 | Fuji Soft 4 | Fuji Soft 4 |
| Stabilizing agent (g) | Guar gum 6 | Water-soluble starch 10 | Soybean protein 40 | Glucomannans 3 | Agar 5 | Soybean protein 40 | Psyllium seed gum 3 |
| Soybean protein (g) | Fuji Pro R 210 | Fuji Pro K 180 | Fuji Pro V 140 | Fuji Pro R 180 | Fuji Pro R 180 | Fuji Pro R 140 | Fuji Pro R 180 |
| Starch (g) | Potato starch 100 | Corn starch 60 | Potato starch 90 | Potato starch 60 | Potato starch 100 | Potato starch 100 | Potato starch 120 |
| Dietary fiber (g) | Bran 30 | Powdered bean-curd refuse 30 | Powdered bean-curd refuse 60 | Bran 60 | Corn fiber 40 | Corn fiber 40 | Polydextrose 20 |
| Additives (g) | | | | Mugwort powder 15 | Green tea* 20 | Hijiki powder 20 | Sesame* 20 |
| Salt (g) | 2 | 2 | 2 | | | | |
| Sugar (g) | 10 | 10 | 10 | | | | |

*: Used after soaking in water, and covering with soybean protein.

TABLE 2

| Embodiment No. | 9 | 10 | 11 | 12 | 13 | 14 |
|---|---|---|---|---|---|---|
| Water (ml) | 670 | 650 | 670 | 650 | 650 | 650 |
| Foaming agent (g) | Fuji Soft 4 | Fuji Soft 4 | Fuji Soft 4 | Fuji Soft 4 | Celcream 11 | Celcream 18 |
| Stabilizing agent (g) | Guar gum 6 | Guar gum 6 | Guar gum 6 | Guar gum 6 | Guar gum 6 | Guar gum 6 |
| Soybean protein (g) | Fuji Pro R 180 | Fuji Pro R 180 | Fuji Pro R 180 | Fuji Pro R 180 | Fuji Pro R 200 | Fuji Pro R 210 |
| Starch (g) | Potato starch 60 | Potato starch 60 | Potato starch 60 | Potato starch 60 | Waxy starch 40 | Waxy starch 50 |
| Dietary fiber (g) | Powdered bean-curd refuse 90 | Powdered bean-curd refuse 90 | Powdered bean-curd refuse 90 | Powdered bean-curd refuse 90 | Powdered bean-curd refuse 80 | Powdered bean-curd refuse 80 |
| Additives (g) | Mugwort powder 20 | Green tea* 30 | Hijiki powder 20 | Sesame* 30 | | |

*: Used after soaking in water, and covering with soybean protein.

By analyzing the puffed food obtained in Example 13, it was found that the food contains, in 100 g thereof, 11.8 g of water, 50.2 g of protein, 5.5 g of fat, 25.8 g of sugar, 2.3 g of fibers and 4.4. g of ash, and provides 363 kcal of energy. Thus, it was recognized that the puffed food obtained in such manner is rich in protein and dietary fibers, and contains less fat.

Example 15

A dough obtained similarly to that of Example 1 was placed on a meshed plate in a form of thick drops of approximately 3 cm in diameter with a spacing between them, and heated in an oven at a temperature of approximately 200° C. for about 5. min, and a food material similar to a chou was obtained.

Example 16

A dough obtained in a manner similar to that of Example 1 was formed into thin sheets, placed on a meshed plate with a spacing between them, and heated in a oven at a temperature of approximately 120° to 150° C. for about 5 min until the water content comes to be in the order of 25 to 30%, and a non-fried food material similar to fried bean-curd was obtained. The food material was seasoned according to a conventional method, and a seasoned food material similar to fried bean-curd was obtained.

INDUSTRIAL APPLICABILITY

According to the invention, a puffed food containing a soybean protein, starches and dietary fibers in a well-balanced manner, and significantly reduced in cholesterol content, because the use of materials high in cholesterol content such as eggs is avoided, can be obtained, and can be claimed to be a healthy food. Moreover, the puffed food is superior in flavor and taste, excellent in puffing property and foaming evenness without using any egg-originated foaming agent.

Additionally, the dough according to the invention can be used for producing the puffed food having such characteristics as described above, provides a good freeze-storability, because use of yeast, baking powders and the like are avoided, and is superior in controllability at the time of freezing and storage.

We claim:

1. A puffed food dough comprising soybean protein, starch and dietary fiber in a ratio by weight of from 1:0.2 to 0.8: 0.01 to 0.4, respectively, and from 0.5 to 5 parts by weight of a vegetable foaming agent and from 150 to 300 parts by weight of water per 100 parts by weight in total of the soybean protein, starch, and dietary fiber. The dough does not contain a chemical leavening agent or yeast.

2. The puffed food dough of claim 1, wherein the dough comprises soybean protein, starch and dietary fiber in a ratio by weight of from 1:0.33 to 0.7:0.05 to 0.3, respectively.

3. The puffed food dough of claim 1 or 2, wherein the vegetable foaming agent is an enzyme-decomposed soybean protein.

4. The puffed food dough of claim 1, wherein the dough contains an additive selected from the group consisting of seeds, nuts, leaves and pieces of seaweed.

5. The puffed food dough of claim 1, comprising from 1 to 2 parts be weigh of the vegetable foaming agent and from 180 to 250 parts by weight of the water per 100 parts by weight in total of soybean protein, starch and dietary fiber.

6. A method for producing a puffed food product comprising preparing a dough containing soybean protein, starch and dietary fiber in a ratio by weight of from 1:0.2 to 0.8:0.01 to 0.4, respectively, and from 0.5 to 5 parts by weight of a vegetable foaming agent and from 150 to 300 parts by weight of water per 100 parts by weight in total of the soybean protein, starch and dietary fiber, said dough not containing a chemical leavening agent or yeast, and thereafter heating said dough to form said puffed food product.

7. The method of claim 6, wherein the dough contains soybean protein, starch and dietary fiber in a ratio by weight of from 1:0.33 to 0.7:0.05 to 0.3, respectively.

8. The method of claim 6 or 7, wherein the vegetable foaming agent is an enzyme-decomposed soybean protein.

9. The method of claim 6, wherein the dough is heated in a microwave irradiation apparatus or a heated oven.

10. The method of claim 6, wherein the dough contains an additive selected from the group consisting of seeds, nuts, leaves and pieces of seaweed.

* * * * *

UNITED STATES PATENT AND TRADEMARK OFFICE
CERTIFICATE OF CORRECTION

PATENT NO.   :   5,591,471
DATED        :   January 7, 1997
INVENTOR(S)  :   Shichiro Niwano et al.

It is certified that error appears in the above-indentified patent and that said Letters Patent is hereby corrected as shown below:

Claim 1, column 10, lines 9-10, change . "The dough does not contain" to -- , said dough not containing--. Delete the "," after starch.

Claim 5, column 10, line 20, change "be" to --by--.

Signed and Sealed this

Fifteenth Day of April, 1997

*Attest:*

BRUCE LEHMAN

*Attesting Officer*        Commissioner of Patents and Trademarks